United States Patent
Sinha et al.

(10) Patent No.: US 8,450,018 B2
(45) Date of Patent: May 28, 2013

(54) METHOD TO AUTOMATICALLY ENABLE/DISABLE STACK RECONDITIONING PROCEDURE BASED ON FUEL CELL STACK PARAMETER ESTIMATION

(75) Inventors: Manish Sinha, Pittsford, NY (US); Sriram Ganapathy, Rochester, NY (US); Tayoung Choi, Rochester, NY (US); David A. Arthur, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 497 days.

(21) Appl. No.: 12/708,461

(22) Filed: Feb. 18, 2010

(65) Prior Publication Data

US 2011/0200895 A1    Aug. 18, 2011

(51) Int. Cl.
*H01M 8/06* (2006.01)
(52) U.S. Cl.
USPC ........... 429/427; 429/429; 429/430; 429/432; 429/443; 429/413

(58) Field of Classification Search
USPC ............... 429/417, 427–434, 442–449
See application file for complete search history.

(56) References Cited

U.S. PATENT DOCUMENTS

2011/0091781 A1*    4/2011   Folmsbee et al. ............. 429/413

\* cited by examiner

*Primary Examiner* — Patrick Ryan
*Assistant Examiner* — Ben Lewis
(74) *Attorney, Agent, or Firm* — John A. Miller; Miller IP Group, PLC

(57) ABSTRACT

A system and method for determining when to trigger reconditioning of a fuel cell stack and when to disable the reconditioning of the fuel cell stack. In one embodiment, the stack reconditioning is triggered when a maximum stack power estimation falls below a first predetermined power threshold. The reconditioning of the stack can be disabled so it is not performed when the trigger occurs if the reconditioning process does not raise the maximum power estimation above a second predetermined power threshold or the time from one reconditioning trigger to a next reconditioning trigger is less than a predetermined time threshold, or both.

20 Claims, 5 Drawing Sheets

METHOD TO AUTOMATICALLY ENABLE/DISABLE STACK RECONDITIONING PROCEDURE BASED ON FUEL CELL STACK PARAMETER ESTIMATION

BACKGROUND OF THE INVENTION

1. Field of the Invention

This invention relates generally to a system and method for determining when to recondition a fuel cell stack and when to disable reconditioning the fuel cell stack and, more particularly, to a system and method for determining when to recondition a fuel cell stack and when to disable reconditioning the fuel cell stack that includes triggering a stack reconditioning process when a stack maximum power estimation falls below a first predetermined power threshold, disabling the reconditioning of the fuel cell stack if the stack reconditioning does not raise the maximum stack power estimation above a second predetermined power threshold, and/or disabling the reconditioning of the fuel cell stack if the reconditioning trigger time from a last reconditioning process is less than a predetermined time threshold.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

In a fuel cell system, there are a number of mechanisms that cause permanent loss of stack performance, such as loss of catalyst activity, catalyst support corrosion and pinhole formation in the cell membranes. However, there are other mechanisms that can cause stack voltage losses that are substantially reversible, such as the cell membranes drying out, catalyst oxide formation, and build-up of contaminants on both the anode and cathode side of the stack. Therefore, there is a need in the art to remove the oxide formations and the build-up of contaminants, as well as to rehydrate the cell membranes, to recover losses in cell voltage in a fuel cell stack.

Wet stack operation, that is, operation with a high amount of humidification, is desirable for system humidification, performance and contaminant removal. However, there are various reasons to operate a fuel cell stack with a lower amount of humidification, also known as dry conditions. For example, wet stack operation can lead to fuel cell stability problems due to water build up, and could also cause anode starvation resulting in carbon corrosion. In addition, wet stack operation can be problematic in freeze conditions due to liquid water freezing at various locations in the fuel cell stack. Therefore, there is a need in the art for systems that have been optimized for non-wet operating conditions.

U.S. patent application Ser. No. 12/580,912, filed Oct. 16, 2009, titled Automated Procedure For Executing In-Situ Fuel Cell Stack Reconditioning, assigned to the assignee of this application and herein incorporated by reference, discloses a system and method for reconditioning a fuel cell stack that includes increasing the humidification level of the cathode side of the stack to hydrate the cell membranes and providing hydrogen to the anode side of the fuel cell stack at system shut-down, where the system monitors reconditioning event triggers, reconditioning thresholds and reconditioning system checks so that the reconditioning process can be provided during vehicle operation.

Generally, stack reconditioning includes running the fuel cell stack with high relative humidity to remove contaminates from the stack to recover from stack degradation. However, reconditioning is an abnormal operation and exposes the stack to wet operations that may cause reliability issues if liquid water ends up in anode flow-fields and low anode flow rates are not able to purge them out. Thus, reconditioning should be performed only when it is absolutely necessary. Previous stack reconditioning triggers included triggering the reconditioning by monitoring the number of vehicle trips or key cycles. If the number of trips exceeded a threshold, which is considered as a representation of time after which stack voltage has degraded, the reconditioning process is triggered. However, improvements in triggering the reconditioning process can be made so that the reconditioning is only performed when necessary to reduce the abnormal operation conditions.

SUMMARY OF THE INVENTION

In accordance with the teachings of the present invention, a system and method are disclosed for determining when to trigger reconditioning of a fuel cell stack and when to disable the reconditioning of the fuel cell stack. In one embodiment, the stack reconditioning is triggered when a maximum stack power estimation falls below a first predetermined power threshold. The reconditioning of the stack can be disabled so it is not performed when the trigger occurs if the reconditioning process does not raise the maximum power estimation above a second predetermined power threshold or the time from one reconditioning trigger to a next reconditioning trigger is less than a predetermined time threshold, or both.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for triggering a fuel cell stack reconditioning process and disabling the stack reconditioning process is merely exemplary in nature, and is in no way intended to limit the invention or its applications or uses.

Figure 1:
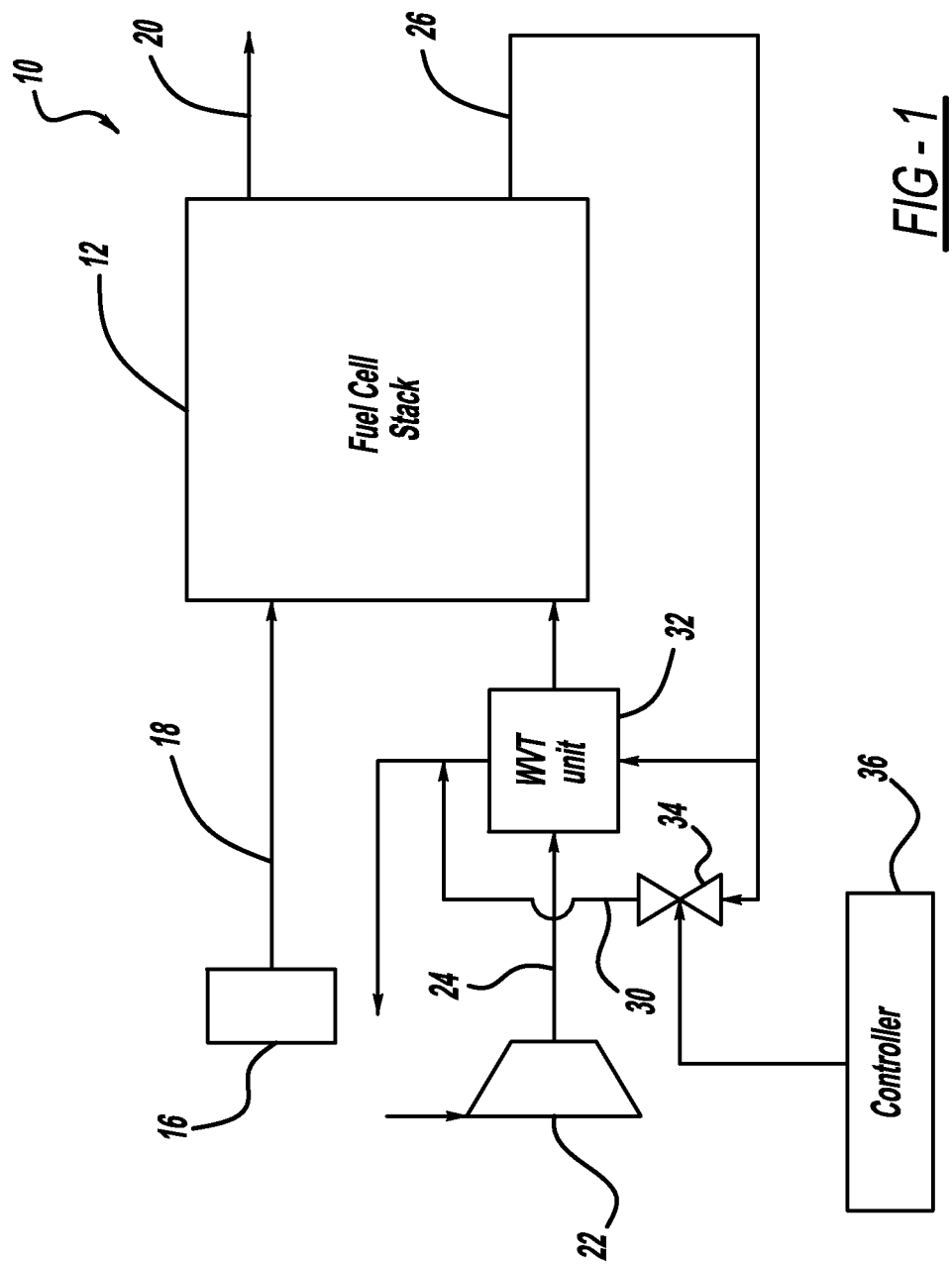
FIG. 1 is a block diagram of a fuel cell system.

FIG. 1 is a schematic block diagram of a fuel cell system 10 including a fuel cell stack 12. The fuel cell stack 12 receives hydrogen from a hydrogen source 16 on anode input line 18 and provides an anode exhaust gas on line 20. A compressor 22 provides airflow to the cathode side of the fuel cell stack 12 on cathode input line 14 through a water vapor transfer (WVT) unit 32 that humidifies the cathode input air. The WVT unit 32 is employed in this embodiment as a non-limiting example, where other types of humidification devices may be applicable for humidifying the cathode inlet air, such as enthalpy wheels, evaporators, etc. A cathode exhaust gas is output from the stack 12 on a cathode exhaust gas line 26. The exhaust gas line 26 directs the cathode exhaust to the WVT unit 32 to provide the humidity to humidify the cathode input air. A by-pass line 30 is provided around the WVT unit 32 to direct some or all of the cathode exhaust gas around the WVT unit 32 consistent with the discussion herein. In an alternate embodiment, the by-pass line 30 can be an inlet by-pass. A by-pass valve 34 is provided in the by-pass line 30 and is controlled to selectively redirect the cathode exhaust gas through or around the WVT unit 32 to provide the desired amount of humidity to the cathode input air.

A controller 36 controls whether the by-pass valve 34 is opened or closed, and how much the by-pass valve 34 is opened. By controlling the by-pass valve 34, the controller 36 is able to determine how much cathode exhaust gas is directed through the WVT unit 32, and thus how much water from the cathode exhaust gas will be used to humidify the cathode input air.

Cathode outlet humidification is a function of stack operating conditions, including cathode and anode inlet relative humidity, cathode and anode stoichiometry, pressure and temperature. During reconditioning, discussed below, it is desirable to increase the humidification level of the membranes. This is typically accomplished by increasing the cathode outlet relative humidity. In this embodiment, the by-pass valve 34 is controlled during stack reconditioning to increase the humidification level of the cathode inlet air. The stack operating condition set-points will then be manipulated to further increase the cathode outlet relative humidity to the set-point, as is known in the art. Examples include reducing the stack temperature or reducing the cathode stoichiometry.

The fuel cell stack 12 may be operated relatively dry, such as with a cathode inlet and exhaust relative humidity that is less than 100%. Such dry stack operation over prolonged periods of time could lead to the drying-out of components in the stack 12, such as the cell membranes and the MEA catalyst layers. Drying out of the stack 12 is more likely under low power operation when the amount of water produced by the fuel cell stack 12 is low, but is more noticeable under high power. In addition, operation under low power and high cell voltages leads to a higher rate of oxide formation on the catalyst, particularly when a precious metal catalyst is used.

As will be discussed below, stack reconditioning is provided to remove contaminants from within the stack 12, such as sulfates and chlorides, that affect stack performance. During stack reconditioning, the fuel cell stack 12 is operated under wet conditions at semi-regular intervals. By operating the stack relatively wet, various ions and other molecules will go into solution within the stack 12 and be better able to be driven out by water flow through the reactant gas flow channels. Such wet conditions, for example, may be in excess of 110% relative humidity at high current densities, although other percentages of relative humidity could be used. The fuel cell system is shut down while maintaining these wet conditions. Immediately after the fuel cell system 10 is shut down, the cathode side catalyst is blanketed with hydrogen and a mixture of other gases, such as nitrogen and water vapor. This procedure is described in more detail below.

Figure 2:
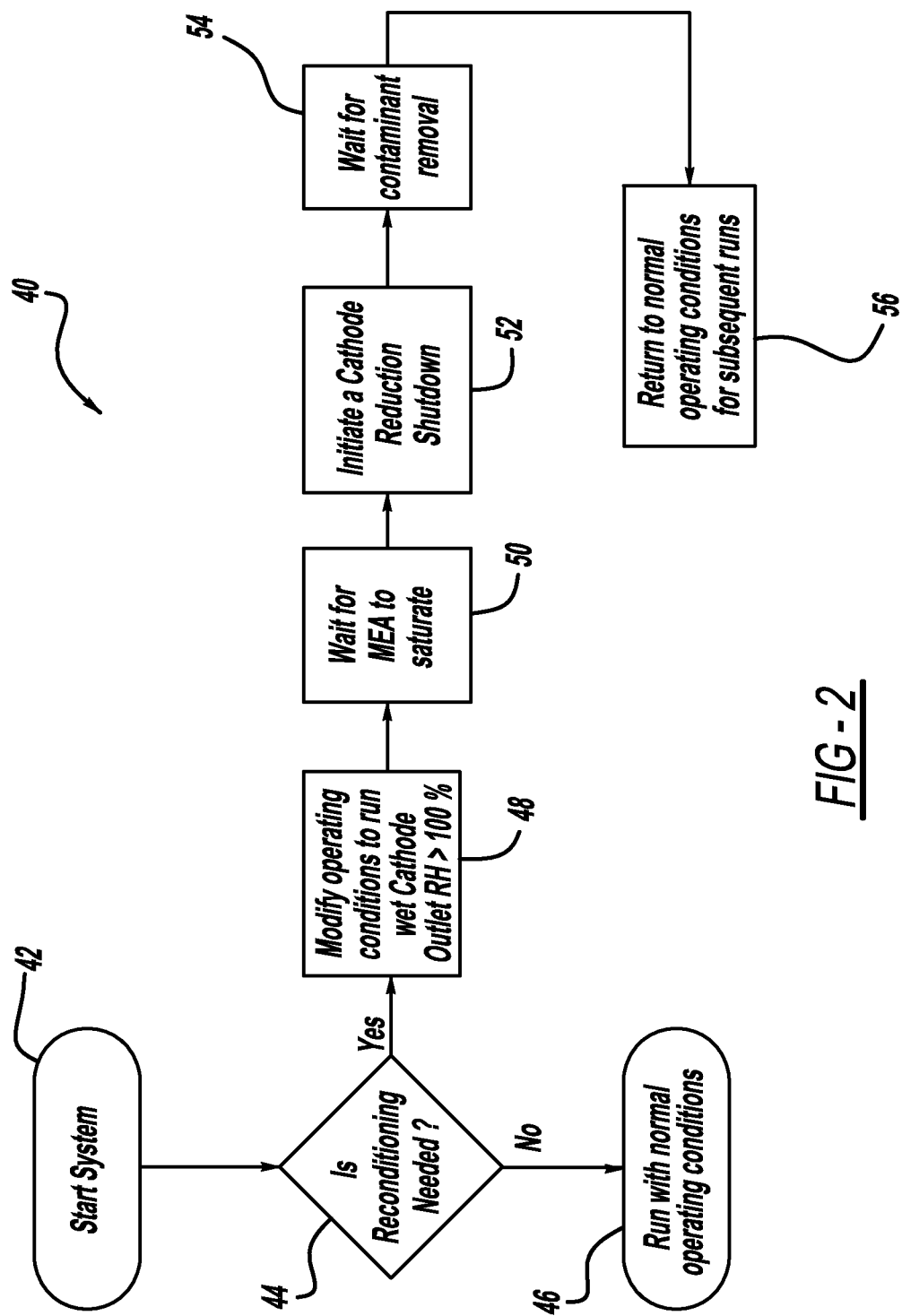
FIG. 2 is a flow chart diagram showing a reconditioning process for removing oxidation and contaminant build up in a fuel cell stack through a reconditioning process.

FIG. 2 is a flow diagram 40 showing possible steps for reconditioning the fuel cell stack 12, thereby enabling recovery of the voltage of the fuel cell stack 12. A system start is the first step at box 42. The controller 36 determines whether reconditioning of the fuel cell stack 12 is needed at decision diamond 44. The present invention contemplates any suitable algorithm or device that can detect the affects from stack contaminants that may require stack 12 reconditioning, such as low voltages, low humidity levels, low stack power, etc. If the controller 36 determines that reconditioning of the fuel cell stack 12 is not needed at the decision diamond 44, then the controller 36 does not enable the reconditioning procedure and the fuel cell system 10 operates under normal operating conditions at box 46.

If, however, the controller 36 determines that reconditioning of the fuel cell stack 12 is needed at the decision diamond 44, then the procedure for reconditioning the stack 12 is triggered. The controls and calibrations necessary to perform the reconditioning procedure are embedded in the software of the controller 36. The controller 36 modifies the operating conditions such that the cathode exhaust gas on the line 26 is operated under wetter conditions at box 48 than would occur under normal operating conditions. An example of such wet conditions is a cathode exhaust gas relative humidity on the line 26 that is in excess of 100% relative humidity, depending on the velocities of anode and cathode gases. If the gas velocity is low, normal outlet relative humidity on the line 26 may be maintained. However, it will be readily apparent to those skilled in the art that wet conditions that are of a different outlet relative humidity and varying gas velocities may be used.

Next, the controller 36 waits for the cell MEAs to saturate to a desired relative humidity level at box 50. Liquid water flooding the fuel cell stack during saturation at box 50 on either the anode or the cathode side can be managed by actively controlling bleed, drain, and other system valves, or can be managed by increasing cathode stoichiometry. One example of avoiding flooding of the stack 12 is to operate the stack at a higher current density, thereby utilizing higher cathode and anode velocities. However, one skilled in the art will recognize that there are other ways to prevent flooding.

By way of example, the amount of time necessary to saturate the cell MEAs to the desired humidity level may be a period of time in excess of 20 minutes at a stack current density in the range of 0.4-1 $A/cm^2$. Lower current densities can also be effective; however, they may require longer run times than those at high current density. Those having skill in the art will readily recognize that a different period of time and a different current density range will achieve the desired saturation level. Thus, this example is not intended to limit the scope of the invention in any way.

Once the cell MEAs have saturated to the desired humidity level at the box 50, the controller 36 initiates a cathode reduction upon system shut down at box 52. Cathode reduction requires that hydrogen be used to takeover and blanket the cathode side of the fuel cell stack 12. Any dry-out purges that the system would normally undergo upon shut down are not used during this procedure. By maintaining excess hydrogen in the anode side of the stack 12 upon system shut down, the hydrogen is able to cross the membranes by permeation to the cathode side, by direct injection, or a combination thereof, to consume available oxygen. By consuming oxygen on the cathode side of the stack 12 using hydrogen, various contaminants are reduced in the cathode side, such as those that may be bonded to platinum sites in the cathode catalyst. It is important to refrain from applying loads to the stack 12 that would accelerate the oxygen consumption during this step of the procedure. Thus, the process described so far includes first saturating the MEAs in the fuel cells in the stack 12 by humidifying the cathode inlet air above normal humidity levels, and then maintaining that saturation level to system shut down at which time hydrogen is introduced to the anode side of the fuel cell stack 12 under no load conditions to consume oxygen on the cathode side. Of course, there are limitations as to how wet the fuel cell stack 12 can be after system shut down under certain operating conditions, such as freeze conditions.

After the cathode side has been adequately blanketed with hydrogen at the box 52, the controller 36 waits for a period of time to allow for contaminant removal at box 54. By way of example, and in no way intended to limit the scope of the invention, the amount of time allowed for contaminant removal could be twenty minutes. Additional soak time may be beneficial, as more water vapor will condense when the system cools down, which will then be useful for removal of a greater fraction of the contaminants. If the required amount of time is not met prior to a system start at box 56, the benefit may not be fully realized, and the procedure may need to be repeated. When the fuel cell system 10 is restarted at box 56 after a successful reconditioning, it should function under its normal operating conditions. In the instance of an unsuccessful reconditioning, the controller will take appropriate steps, as described herein.

The above procedure enhances the ability of the fuel cell MEAs to react the fuel and oxidant because (1) the higher fraction of liquid water enables any soluble contaminates to wash off, (2) the higher level of membrane electrode saturation increases the proton conductivity of the membrane and electrode, (3) the reduction in voltage under wet conditions leads to the reduction in the surface coverage of sulfate ($HSO_4^-$)-like poisoning species which then get washed off during subsequent operation, and (4) the reduction of surface oxides, such as platinum oxide (PtO) and platinum hydroxide (PtOH), which expose more of the precious metal sites.

Thus, the fuel cell stack 12 reconditioning process will provide a cell voltage performance increase by reducing the voltage losses associated with membrane resistance and catalyst layer performance. Testing has revealed that this benefit could be as large as 50 mV per cell. This increase is sustainable for hundreds of hours and can be repeated for a similar level of recovery. As a result of this increase, stack life will increase resulting in a longer service life for the fuel cell stack 12. Regular intervals of this procedure will result in a higher level of maximum performance and greater system efficiency. This procedure could also serve to re-humidify any cathode water re-humidification device, such as the WVT unit 32.

A more detailed discussion of entering, exiting and determining if the reconditioning was successful is discussed below, and is applicable for a reconditioning process that is performed while the vehicle is in operation. More particularly, as will be discussed below, the algorithms for operating the reconditioning process include an algorithm to trigger the reconditioning process, an algorithm to protect the system and the vehicle operator from any adverse side effects from the modified conditions caused by the reconditioning process, an algorithm to determine if the system is sufficiently humidified, an algorithm to determine which type of shut-down to perform, and an algorithm to determine if the reconditioning process was successful.

The reconditioning process uses modified operating conditions that are not optimized for normal operation. Therefore, it is desirable to only perform the reconditioning process periodically. This could be based on calendar time, time on load, vehicle trips, voltage degradation, etc. Each algorithm referred to above has advantages and disadvantages, but it is important to perform the reconditioning process periodically to maximize over-all efficiency, performance and/or durability impacts that could result from reconditioning. Further, it is necessary to protect the system from adverse side effects from the modified conditions. The wet operation that is allowed during the reconditioning process could lead to anode starvation. This is mitigated through an aggressive bleed strategy. However, if starvation is detected, the algorithm can be aborted and normal operation can be resumed. The wet operation also puts the system at risk for difficulty in freeze events. Therefore, the reconditioning process is not executed or is aborted if a risk for a freeze event is detected.

Additionally, the wet operation could affect the vehicle performance due to power limitations on aggressive load profiles. If performance is limited, the reconditioning process may be aborted and returned to normal operating conditions and performance. A critical component of the reconditioning process is to sufficiently humidify the stack 12. In order for the humidification to occur consistently during customer use, the operating conditions must be modified such that this humidification occurs under common load profiles, such as the EPA city cycle. It is also important for the system to know when it has reached a sufficient level of humidification. This can be done using a water buffer model (WBM) to estimate the amount of water present in the membrane and diffusion media of the stack 12. As described above, it is desirable to perform a cathode reduction shut-down after the MEA is sufficiently wet. When the driver initiates a shut-down, there can be logic using the previously described WBM criteria to determine which type of shut-down to perform. If it is determined that the MEAs are sufficiently humidified, a cathode reduction shut-down can be performed. If the previous run did not sufficiently humidify the MEAs, a normal shut-down procedure could be initiated. This is important because the cathode reduction shut down results in some positive performance gains, and it does not execute other desired functions, such as a purge for freeze.

Finally, it is necessary to determine if all of the conditions of the shut-down have been met. If the system has been sufficiently humidified, executed a proper cathode reduction shut-down and soaked a sufficient amount of time, all the criteria discussed above have been met and the reconditioning process is a success. If not, the reconditioning process will be attempted again until it is either successful or it exceeds a predetermined number of attempts.

Figure 3:
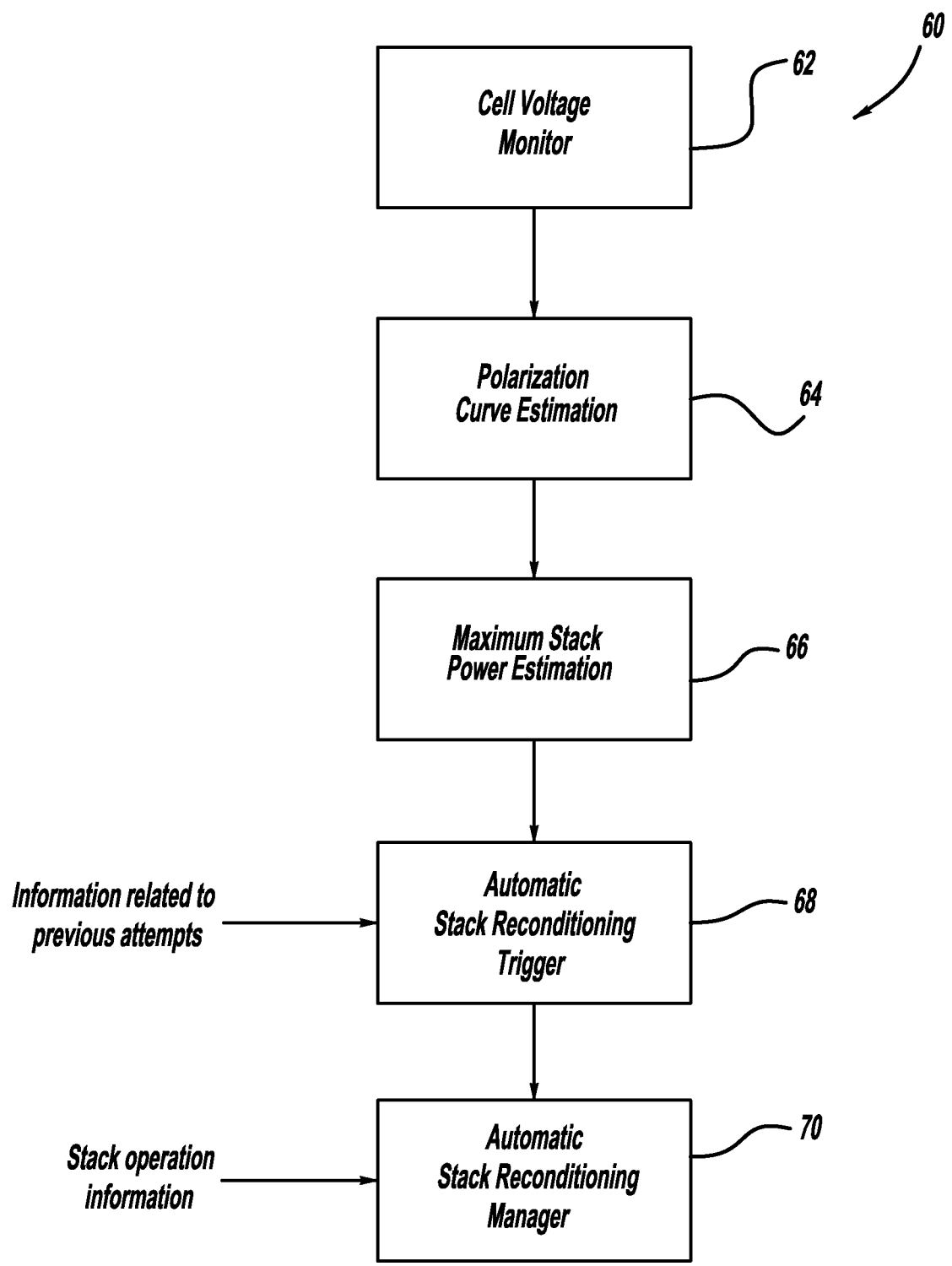
FIG. 3 is a block diagram showing a proposed process for triggering the stack reconditioning process and disabling the stack reconditioning process.

FIG. 3 is a block diagram of a system 60 for determining when to trigger stack reconditioning and when to disable stack reconditioning. The maximum cell voltage $CV_{max}$, the average cell voltage $CV_{avg}$ and the stack current $J_{stck}$ are determined by a cell voltage monitor at box 62 that monitors the voltage of the fuel cells in the stack 12. These values are provided to a polarization curve estimation box 64 that estimates polarization curve parameters that define the stack operation. The polarization curve estimation parameters can be determined in any suitable manner. For example, U.S. patent application Ser. No. 11/669,898 filed Jan. 31, 2007, titled Algorithm For Online Adaptive Polarization Curve Estimation of a Fuel Cell Stack, assigned to the assignee of this application and herein incorporated by reference, discloses one such technique, and is outlined below.

A cell voltage model is used to determine the parameters as:

$$E_{cell} = E_{rev} - (i+a)*R_{HFR} - \left(0.07*\log_{10}\left(\frac{i+a}{i^0}\right) + c\log_{10}\left(1 - \frac{i}{i^\infty}\right)\right) \quad (1)$$

Where the following measurements are provided:
$E_{cell}$=Cell voltage (V)
i=Current density (A/cm$^2$); and
$R_{HFR}$=Cell HFR resistance measurement or from model (ohm cm$^2$).
The following assumed constants are provided:
$E_{rev}$=Thermodynamic reversible cell potential (V); and
a=Background current density from Cell Shorting/Cell crossover (A/cm$^2$).
The following parameters are provided:
i$^0$=Exchange current density (A/cm$^2$);
i$^\infty$=Limiting current density (A/cm$^2$); and
c=Mass transfer coefficient.

For a system with very repeatable membrane humidification control, $R_{HFR}$ might be represented as a function of stack current density. Similarly, $E_{rev}$ might also be represented as a function of stack current density. This suggests that at each current density, the operating pressure, temperature, stoichiometry and humidification are sufficiently repeatable to use a simplistic term. In another embodiment, the average, $R_{HFR}$ could be either measured or calculated at each count. The value $E_{rev}$ could be computed the same way, based on temperature and pressure data at each count.

The cell voltage model of equation (1) can be simplified by ignoring the constant a so that equation (1) becomes:

$$E_{cell} = E_{rev} - (i)*R_{HFR} - \left(0.07*\log_{10}\left(\frac{i}{i^0}\right) + c\log_{10}\left(1 - \frac{i}{i^\infty}\right)\right) \quad (2)$$

Rearranging the terms in equation (2) gives:

$$E_{rev} - (i)*R_{HFR} - E_{cell} = \left(0.07*\log_{10}\left(\frac{i}{i^0}\right) + c\log_{10}\left(1 - \frac{i}{i^\infty}\right)\right) \quad (3)$$

To provide the parameter estimation, the following variables are defined:

$y = =E_{rev} - (i)*R_{HFR} - E_{cell}$ $X = i$ $\theta_1 = i^0$ $\theta_2 = i^\infty$ $\theta_3 = c$ Equation (3) can be represented in the following form:

$$y = F(x,\theta) \quad (4)$$

Thus, equation (3) can be represented as:

$$y = \left(0.07*\log_{10}\left(\frac{x}{\theta_1}\right) + \theta_3 \log_{10}\left(1 - \frac{x}{\theta_2}\right)\right) \quad (5)$$

In equation (5), the input-output pair is (x,y) and the parameters to be estimated are $\theta=[\theta_1,\theta_2,\theta_3]^T$. For a given training set G=x(i),y(i): (i=1, 2, . . . , M), a cost function to be minimized can be defined as:

$$J(\theta, G) = \frac{1}{2}\sum_{i=1}^{M}|y(i) - F(x(i), \theta)|^2 \quad (6)$$

By letting $\epsilon(i)=y(i)-F(x(i),\theta)$, equation (6) becomes:

$$J(\theta, G) = \frac{1}{2}\sum_{i=1}^{M}\epsilon(i)^T = \frac{1}{2}\epsilon(\theta, G)^T\epsilon(\theta, G) \quad (7)$$

Therefore, the parameter estimation solves a non-linear least squares problem so that the solution $\theta=[\theta_1,\theta_2,\theta_3]^T$ minimizes $J(\theta,G)$.

The non-linear least squares problem can be solved using any suitable numerical method, such as a Gauss-Newton estimation with a Levenberg-Marquardt update method. The Gauss-Newton approach can be summarized by linearizing an error $\epsilon(\theta,G)$ at the current value of $\theta(k)$ where k is an iteration index, and solving the least squares problem to minimize the error value and estimate $\theta(k+1)$. In one embodiment, the computation is minimized by setting the value $\theta_2$ to a constant $\theta_c$ and estimating the other two parameters $\theta_1$ and $\theta_3$. However, this is by way of a non-limiting example in that all three of the parameters $\theta_1$, $\theta_2$ and $\theta_3$ can be estimated by the algorithm or any other suitable parameters.

In other embodiments, different techniques could be used to solve equation (7). For example, for stacks in which performance is insensitive to $i^\infty$ this parameter could be replaced with a constant. Then the parameters $i^0$ and c could be solved sequentially. The parameter $i^0$ could be solved by using data collected at low enough current density to minimize mass transport losses, but high enough to minimize the effect of permeation (0.05-0.1 A/cm²). Then the resulting equation could be solved with the high current density data to obtain the parameter c.

Next, the algorithm uses the polarization curve parameters to determine a maximum stack power estimation $P_{max}^{stck}$ at box 66. One suitable technique for determining maximum stack power is disclosed in U.S. patent application Ser. No. 12/027,042, filed Feb. 6, 2008, titled Method For Maximum Net Power Calculation For Fuel Cell System Based on Online Polarization Curve Estimation, assigned to the assignee of this application and herein incorporated by reference. A general depiction of how the maximum stack power is estimated using this procedure is set forth below.

Once the cell voltage is calculated, the algorithm determines whether the calculated cell voltage $E_{cell}$ for that current density j is less than the predetermined cell voltage limit $CV_{Lim}^{Avgcell}$ or $CV_{Lim}^{mincell}$ and, if not, the algorithm moves to the next sample region k to calculate the average cell voltage and the minimum cell voltage for the new higher current density j. If the calculated cell voltage is less than or equal to the cell voltage limit $CV_{Lim}^{Avgcell}$ or $CV_{Lim}^{mincell}$, then the algorithm sets the current density j for the particular sample region as the maximum current density, and calculates the maximum power. The gross power is calculated as voltage times current where the maximum current density j is multiplied by the number of cells $N_{cells}$ and the area $A_{cells}$ of the cells to get the total current of the stack 12. Further, a parasitic power estimation based current density (provided by a look-up table or suitable parasitic estimation algorithm) is subtracted from the power and a correction is added to get the maximum stack power estimation $P_{max}^{stck}$ as:

$$P_{max}^{stck}=(CV_{max}^{X}*N_{cell}*j_{Pmax}^{X}*A_{cell})\text{-parasitics+correction} \quad (8)$$

The gross power is how much the stack 12 is producing and the net power is the gross power minus the parasitic power to operate the fuel cell system, such as operating the compressor, cooling fluid pumps, etc. Typically, tables are generated where the parasitic power is defined for a particular current density j based on experiments and the like. The correction is typically determined empirically and is generally around 5% of the maximum power.

Figure 4:
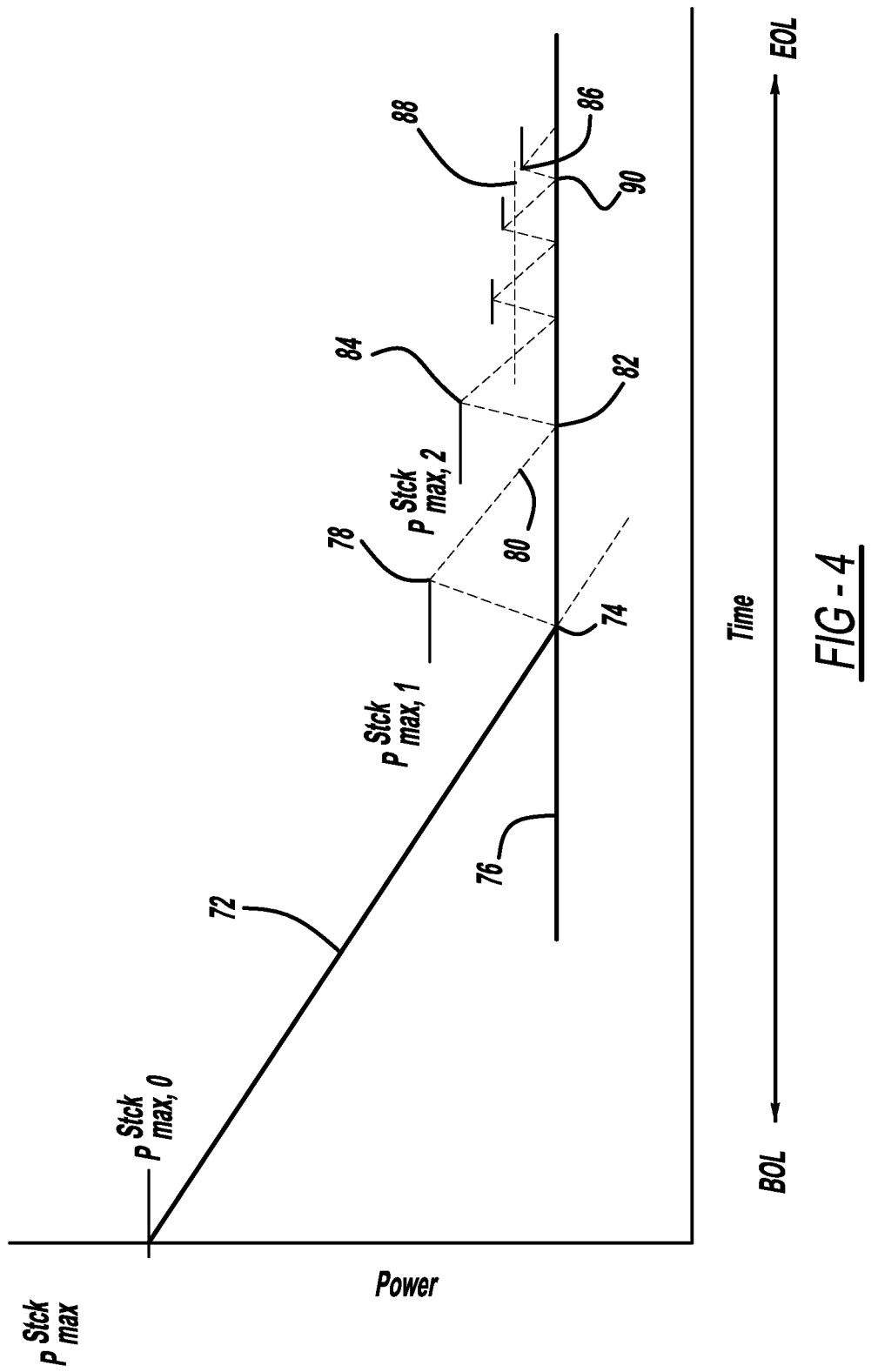
FIG. 4 is a graph with time on the horizontal axis and stack power on the vertical axis showing a time frame for when stack reconditioning is triggered and when stack reconditioning is disabled based on stack power.

Once the algorithm has the maximum stack power estimation $P_{max}^{stck}$, the algorithm determines whether reconditioning of the stack 12 should be triggered based on this power estimation at box 68. FIG. 4 is a graph with time on the horizontal axis showing the beginning of life (BOL) of the stack 12 at the left side and end of life (EOL) of the stack 12 at the right side and stack power estimation on the vertical axis. As the stack 12 ages and degrades towards its end of life on line 72 it will eventually reach a maximum stack power estimation $P_{max}^{stck}$ at point 74 defined by a first power threshold at line 76. In this embodiment, the first power threshold is 70 kW. The threshold value of 70 kW is a non-limiting value and is selected based on a maximum stack power that is slightly above the maximum stack power representative of the end of life of the stack. This is the location where the first stack reconditioning process as described above is initiated. The automatic stack reconditioning is triggered at box 68 using the maximum stack power estimation $P_{max}^{stck}$, where the algorithm also receives information related to previous reconditioning attempts for reasons that will become apparent from the discussion below. As a result of the reconditioning process, the maximum stack power estimation $P_{max}^{stck}$ will increase to point 78, and when the reconditioning process stops, the maximum stack power estimation $P_{max}^{stck}$ will decrease towards the threshold line 74 where a next reconditioning process is triggered at point 82.

The stack recondition triggering based on the maximum stack power estimation $P_{max}^{stck}$ continues over the remaining life of the stack 12. However, after each reconditioning process, the maximum stack power estimation $P_{max}^{stck}$ does not increase to the maximum stack power estimation $P_{max,0}^{stck}$ that occurred as a result of the previous reconditioning process, as shown, because of further stack degradation. Eventually, the increase in the maximum stack power estimation $P_{max}^{stck}$ as a result of stack reconditioning will be less than a second power threshold at line 88 that indicates that further stack reconditioning does not provide enough of an increase in the maximum stack power estimation $P_{max}^{stck}$ to be worthwhile. In this example, the last stack reconditioning is triggered at point 90 because the increase in the maximum stack power estimation $P_{max}^{stck}$ at point 86 does not reach the second power threshold line 88. At this point, all future stack reconditioning is disabled so that no further stack reconditioning occurs and the stack degradation is allowed to continue to decrease until such time that it is unable to produce enough power. The process for determining whether the stack reconditioning is disabled is performed at box 70 in an automatic stack reconditioning manager that receives stack operation information. The automatic stack reconditioning manager also performs other stack reconditioning processes and algorithms.

Figure 5:
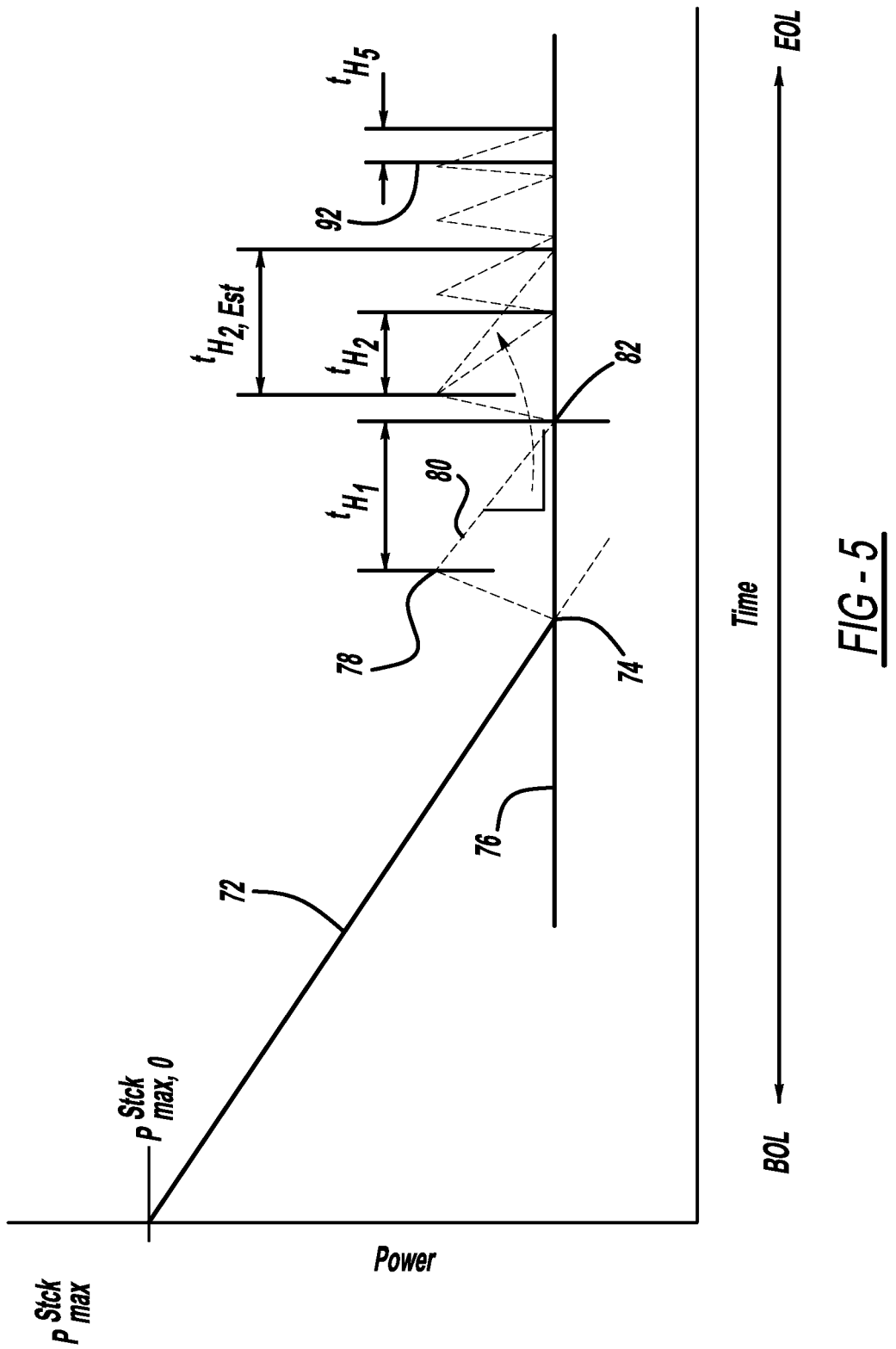
FIG. 5 is a graph with time on the horizontal axis and stack power on the vertical axis showing a method for triggering stack reconditioning based on stack output power and disabling the stack reconditioning based on the time between reconditioning triggers.

According to another embodiment of the invention, the stack reconditioning process is disabled based on the time between when the end of the last reconditioning process occurred and the next reconditioning process is triggered. This embodiment is shown in FIG. 5, which is a graph similar to FIG. 4. Each time a reconditioning process is completed and a next reconditioning process is triggered, a time $t_H$ is recorded as the time between those events. Each time a reconditioning process is triggered, less time goes by since the completion of the reconditioning process as shown by $t_{H_1}$ and $t_{H_2}$. When the time from the end of the last reconditioning process and the trigger for the next reconditioning process is less than a predetermined time threshold, the algorithm determines that further reconditioning is not worthwhile and will disable the stack reconditioning. In this example, the last reconditioning process ends at point 92 because the time $t_{H_5}$ for the next reconditioning trigger when the maximum stack power estimation $P_{max}^{stck}$ reaches the threshold at line 76 is less than the time threshold.

As shown by FIG. 5, as the stack power degrades on the line 80 towards the second reconditioning process trigger at point 82, the algorithm can calculate the degradation rate of the stack 12 by calculating the ramp rate. After the second reconditioning process has occurred, the algorithm can use this degradation rate to estimate the next reconditioning time, represented as $t_{H_2}$Est, and if this estimation integral is less than the time threshold $t_H$, then subsequent reconditioning is not allowed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for triggering and disabling a fuel cell stack reconditioning process, said method comprising:
   determining the voltage and current of fuel cells in the fuel cell stack;
   generating a polarization curve for the fuel cell stack based on the determined voltage and current;
   estimating polarization curve parameters based on the polarization curve;
   determining a maximum stack power estimation of the fuel cell stack based on the polarization curve parameters;
   triggering the stack reconditioning process if the maximum power estimation falls below a first predetermined maximum power threshold for a predetermined period of time, wherein the first predetermined maximum power threshold is between 60 and 70 kW; and
   triggering the reconditioning process each time the maximum stack power estimation falls below the first predetermined maximum power threshold after the maximum stack power estimation increases from a previous stack reconditioning process.

2. The method according to claim 1 further comprising disabling the stack reconditioning process if the maximum stack power estimation of the fuel cell stack does not increase above a second predetermined maximum power threshold after completion of the reconditioning process.

3. The method according to claim 2 wherein the second predetermined maximum power threshold is between 72 and 75 kW.

4. The method according to claim 1 further comprising disabling the stack reconditioning process if the time from the end of a previous stack reconditioning process to the triggering of a next reconditioning process is less than a predetermined period of time.

5. The method according to claim 1 further comprising disabling the stack reconditioning process if an estimated stack degradation rate of the maximum stack power estimation indicates that the time to the next reconditioning process is less than a predetermine period of time.

6. The method according to claim 1 wherein performing the reconditioning process includes providing a hydrogen take-over of the cathode side of the stack during a shut-down of the fuel cell stack and waiting for contaminates to be removed as a result of the increased humidification level and the hydrogen take-over.

7. A method for triggering and disabling a fuel cell stack reconditioning process, said method comprising:
   determining a maximum stack power estimation of the fuel cell stack;
   triggering the stack reconditioning process if the maximum power estimation falls below a predetermined maximum power threshold for a predetermined period of time;
   triggering the reconditioning process each time the maximum stack power estimation falls below the predetermined maximum power threshold after the maximum stack power estimation increases from a previous reconditioning process; and
   disabling the stack reconditioning process if the time from the end of a previous stack reconditioning process to the triggering of a next reconditioning process is less than a predetermined period of time.

8. The method according to claim 7 further comprising disabling the stack reconditioning process if an estimated stack degradation rate of the maximum stack power estimation indicates that the time to a next stack reconditioning process is less than a predetermine period of time.

9. The method according to claim 7 wherein the predetermined maximum power threshold is 70 kW.

10. The method according to claim 7 wherein performing the reconditioning process includes providing a hydrogen take-over of the cathode side of the stack during a shut-down of the fuel cell stack and waiting for contaminates to be removed as a result of the increased humidification level and the hydrogen take-over.

11. A method for triggering and disabling a fuel cell stack reconditioning process, said method comprising:
   determining the voltage and current of fuel cells in the fuel cell stack;
   generating a polarization curve for the fuel cell stack based on the determined voltage and current;
   estimating polarization curve parameters based on the polarization curve;
   determining a maximum stack power estimation of the fuel cell stack based on the polarization curve parameters;
   triggering the stack reconditioning process if the maximum power estimation falls below a first predetermined maximum power threshold for a predetermined period of time;
   triggering the reconditioning process each time the maximum stack power estimation falls below the first predetermined maximum power threshold after the maximum stack power estimation increases from a previous stack reconditioning process; and
   disabling the stack reconditioning process if the maximum stack power estimation of the fuel cell stack does not increase above a second predetermined maximum power threshold after completion of the reconditioning process, wherein the second predetermined maximum power threshold is between 72 and 75 kW.

12. The method according to claim 11 further comprising disabling the stack reconditioning process if the time from the end of a previous stack reconditioning process to the triggering of a next reconditioning process is less than a predetermined period of time.

13. The method according to claim 11 wherein performing the reconditioning process includes providing a hydrogen take-over of the cathode side of the stack during a shut-down of the fuel cell stack and waiting for contaminates to be removed as a result of the increased humidification level and the hydrogen take-over.

14. A method for triggering and disabling a fuel cell stack reconditioning process, said method comprising:
    determining the voltage and current of fuel cells in the fuel cell stack;
    generating a polarization curve for the fuel cell stack based on the determined voltage and current;
    estimating polarization curve parameters based on the polarization curve;
    determining a maximum stack power estimation of the fuel cell stack based on the polarization curve parameters;
    triggering the stack reconditioning process, if the maximum power estimation falls below a first predetermined maximum power threshold for a predetermined period of time;
    triggering the reconditioning process each time the maximum stack power estimation falls below the first predetermined maximum power threshold after the maximum stack power estimation increases from a previous stack reconditioning process; and
    disabling the stack reconditioning process if the time from the end of a previous stack reconditioning process to the triggering of a next reconditioning process is less than a predetermined period of time.

15. The method according to claim 14 further comprising disabling the stack reconditioning process if the maximum stack power estimation of the fuel cell stack does not increase above a second predetermined maximum power threshold after completion of the reconditioning process.

16. The method according to claim 14 further comprising disabling the stack reconditioning process if an estimated stack degradation rate of the maximum stack power estimation indicates that the time to the next reconditioning process is less than a predetermine period of time.

17. The method according to claim 14 wherein performing the reconditioning process includes providing a hydrogen take-over of the cathode side of the stack during a shut-down of the fuel cell stack and waiting for contaminates to be removed as a result of the increased humidification level and the hydrogen take-over.

18. A method for triggering and disabling a fuel cell stack reconditioning process, said method comprising:
    determining the voltage and current of fuel cells in the fuel cell stack;
    generating a polarization curve for the fuel cell stack based on the determined voltage and current;
    estimating polarization curve parameters based on the polarization curve;
    determining a maximum stack power estimation of the fuel cell stack based on the polarization curve parameters;
    triggering the stack reconditioning process if the maximum power estimation falls below a first predetermined maximum power threshold for a predetermined period of time;
    triggering the reconditioning process each time the maximum stack power estimation falls below the first predetermined maximum power threshold after the maximum stack power estimation increases from a previous stack reconditioning process; and
    disabling the stack reconditioning process if an estimated stack degradation rate of the maximum stack power estimation indicates that the time to the next reconditioning process is less than a predetermine period of time.

19. The method according to claim 18 further comprising disabling the stack reconditioning process if the maximum stack power estimation of the fuel cell stack does not increase above a second predetermined maximum power threshold after completion of the reconditioning process.

20. The method according to claim 18 wherein performing the reconditioning process includes providing a hydrogen take-over of the cathode side of the stack during a shut-down of the fuel cell stack and waiting for contaminates to be removed as a result of the increased humidification level and the hydrogen take-over.

* * * * *